United States Patent

[11] 3,568,636

[72] Inventor Glynn H. Lockwood
 Carmel Valley, Calif.
[21] Appl. No. 729,309
[22] Filed May 15, 1968
[45] Patented Mar. 9, 1971
[73] Assignee Lockwood Technical, Inc.
 Sand City (Seaside), Monterey County, Calif.

[54] HOT MELT APPLICATOR SYSTEM
 10 Claims, 11 Drawing Figs.
[52] U.S. Cl. .................................................. 118/259,
 101/366, 118/202
[51] Int. Cl. .................................................. B05c 1/08
[50] Field of Search .................................................. 118/258,
 259, 13, 410, 7, 202; 101/157, 366

[56] References Cited
 UNITED STATES PATENTS

| | | | |
|---|---|---|---|
| 2,726,629 | 12/1955 | Paulsen | 118/259X |
| 3,359,939 | 12/1967 | Von Schoppe | 118/410X |
| 3,410,713 | 11/1968 | Schneidereit | 118/259X |
| 3,424,125 | 1/1969 | Wiggins | 118/7 |

Primary Examiner—John P. McIntosh
Attorney—Charlton M. Lewis

ABSTRACT: A liquid such as hot melt adhesive is supplied at a controlled superatmospheric pressure to the wheel chamber of a wheel-type applicator. The wheel chamber is so formed that liquid can overflow only by passing through a narrow annular channel between the working face of the wheel where it enters the chamber and an opposing chamber wall. Wheel rotation produces shearing action in the liquid in that channel, raising the pressure in the main body of the chamber. As the channel fills, that shear pressure exceeds the controlled supply pressure, positively preventing overflow during wheel rotation.

The controlled supply pressure may be obtained by passing the liquid through an accumulator in which a controlled pressure is maintained by a pressure regulating valve, that pressure being automatically relieved when the wheel stops.

Alternatively, liquid may be supplied to the wheel chamber via two valves that are driven with the wheel to open alternately, thus terminating supply in absence of wheel rotation.

Another aspect of the invention provides a narrow annular channel at the wheel surface between the liquid inlet to the wheel chamber and the doctor blade or equivalent. Wheel rotation then produces at the doctor device a pressure that is higher than the supply pressure. Such enhanced pressure is especially useful with a wheel of intaglio type.

INVENTOR.
GLYNN H. LOCKWOOD,

By Charlton N. Lewis

INVENTOR.
GLYNN H. LOCKWOOD,

By Charlton M. Lewis

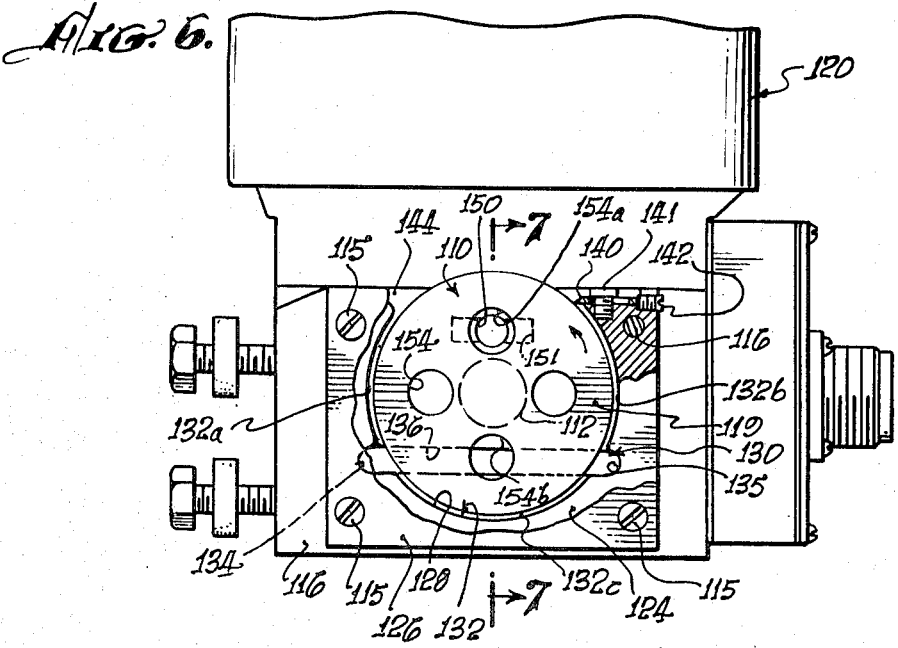
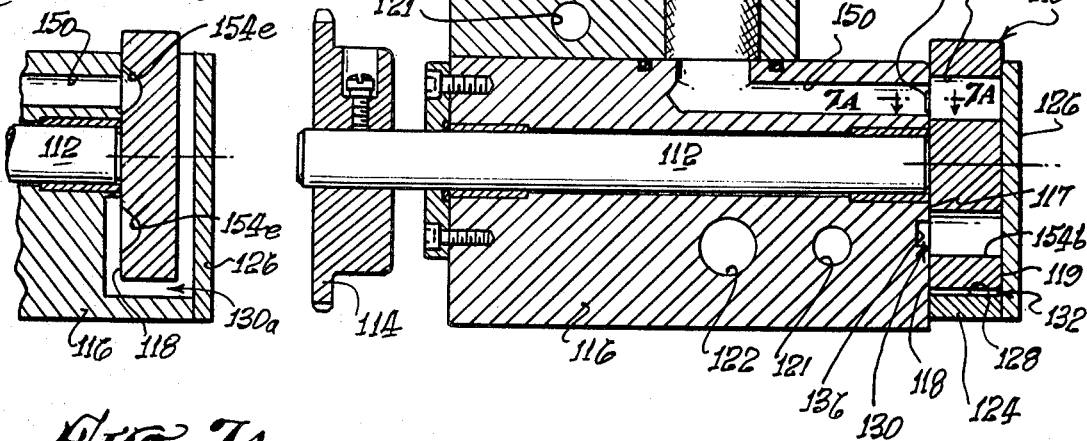
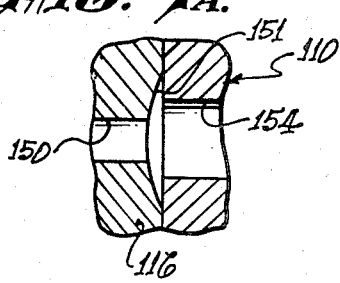

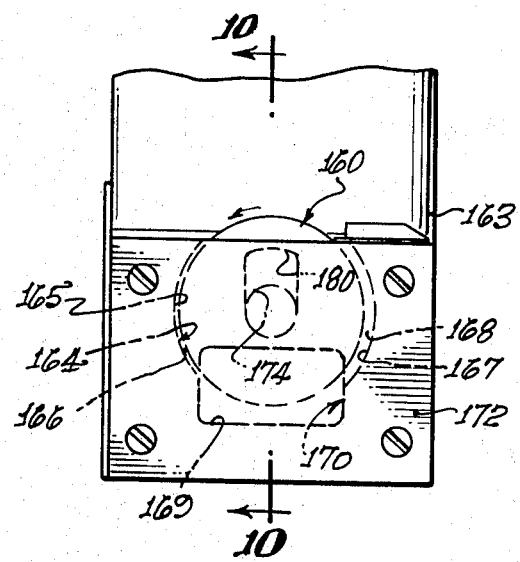
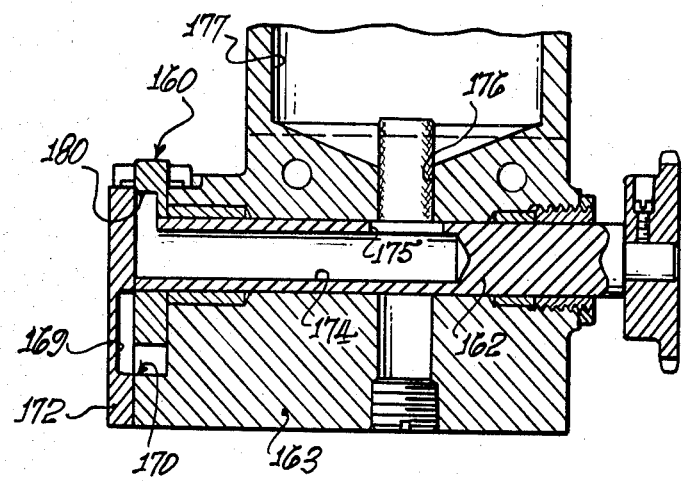

HOT MELT APPLICATOR SYSTEM

This invention has to do with the application of a viscous liquid such as a hot melt adhesive to a work surface by means of a rotatable applicator wheel that is partially immersed in the liquid in a wheel chamber, with a doctor blade or equivalent device for metering the amount of liquid applied.

The invention is concerned more particularly with maintaining an adequate supply of liquid to the wheel chamber without possibility of causing the chamber to overflow. After leaving the chamber, the wheel surface transfers part of its carried liquid to the work, either directly or through an intermediate applicator roll. The wheel surface then reenters the chamber at free surface of the liquid, carrying back to the chamber any liquid not transferred to the work. The wheel is ordinarily driven at essentially constant speed, typically from the conveyor mechanism that carries the workpieces to be coated. The rate of liquid consumption, however, varies with the number of workpieces on the conveyor. If liquid is supplied to the wheel chamber by a positive pump driven with the wheel, for example, an interruption in the flow of workpieces tends to cause the chamber to overflow. On the other hand, if liquid is supplied to the wheel chamber under gravity flow from a meltdown reservoir, for example, the normal variations of level in the reservoir tend to produce excessive variations in the chamber level.

Previous systems have attempted to solve such problems by relatively complex control mechanisms. For example, a supply pump may be turned on and off under control of a sensor responsive to actual liquid level in the wheel chamber, as disclosed in U.S. Pat. Nos. 2,787,241 to Kelley, 2,868,161 to Johnson and 3,255,727 to Kelley. Such control systems, however, are particularly difficult to maintain when operation requires elevated temperatures and when the liquid solidifies during periods of shutdown.

The present invention provides satisfactory supply of liquid to the chamber of an applicator wheel despite variations in such factors as work flow and liquid level in the meltdown reservoir. Moreover, that is accomplished without additional moving parts or sensitive adjustments.

A further aspect of the invention provides effective control of the liquid metered to the work, particularly by an applicator wheel of intaglio form, in which the active surface of the wheel contains small wells or dimples arranged in a desired pattern. As such dimples pass under the doctor blade, they are loaded with liquid to an extent that increases directly with the wheel chamber pressure. Optimum filling of such intaglio wells often requires more chamber pressure than can conveniently be provided with conventional wheel structures. The present invention permits maintenance of relatively high superatmospheric pressure in the wheel chamber immediately adjacent the doctor blade without risk of overflow at the free liquid surface where the wheel reenters the chamber.

In accordance with one aspect of the invention, the level of the free liquid surface at wheel reentry is made to depend primarily upon viscous forces that are produced in a narrow arcuate channel between the wheel surface and a closely spaced opposing wall. The moving wheel surface exerts viscous drag upon liquid in that channel, urging it toward the main body of the wheel chamber. That viscous action maintains in the body of the chamber a fluid pressure which increases with the arcuate length of the channel that is filled with liquid. Under given conditions of wheel speed and liquid viscosity, that pressure reaches a definite peak value when the channel is completely filled. Accordingly, overflow at the free liquid surface can occur during wheel rotation only if liquid is supplied to the wheel chamber at a pressure exceeding that peak value. Hence any method of supply can be effectively used that maintains an input pressure less than that peak value. When the wheel drive is stopped for any reason, liquid supply to the chamber is terminated, preferably by suitable automatic control.

One particularly satisfactory manner of supplying liquid to wheels utilizing the present invention is via an accumulator chamber into which fluid is pumped to a definite level, the volume above the liquid surface being filled with a suitable gas under regulated pressure. For example, air from the plant pressure line or nitrogen from a tank may be supplied to the chamber via a pressure regulating valve of conventional type. A three-way solenoid-controlled valve is inserted in the gasline to exhaust pressure from the tank when the equipment is shut down.

In accordance with a further aspect of the invention, liquid may be supplied to the wheel chamber via a valve mechanism that permits forward flow only during wheel rotation. Such valve mechanism in one form comprises two valves which are connected in series and are opened alternately. Such valves can be arranged to admit liquid to the wheel chamber whenever needed, but positively prevent liquid flow when the wheel stops.

The fluid pressure produced by viscous action in a reentry channel of the type described can be made essentially as large as desired, for example by increasing the length of the channel, decreasing its radial dimension or increasing the peripheral velocity of the wheel. Suitable control of such factors permits convenient variation of the pressure in the wheel chamber, with corresponding variation of the amount of liquid metered by the doctor blade.

Since a deep wheel chamber is not required to provide adequate hydrostatic pressure at the doctor blade, the present invention permits great reduction of the volume of the wheel chamber. That has the advantage of corresponding reduction in the time the hot melt liquid must be maintained at elevated temperature before it is used, and reduces problems due to expansion and contraction of the liquid on change of state.

A further advantage of the invention is that the wheel chamber can be placed at substantially any desired angular relation to the wheel axis. Moreover, the wheel axis need not be horizontal. In fact, with suitable design of the sealing formations between the chamber and wheel, the wheel axis may even be vertical if desired, permitting the wheel to apply fluid to a vertical surface that moves horizontally past the wheel.

When liquid supply to the wheel chamber is via two alternately operated valves, the rate of liquid supply may be controlled through the amount of air that is present in the conduit or chamber between the valves. With suitable valve structure, such air varies automatically with the liquid level in the wheel chamber, tending to increase the rate of liquid supply when the chamber level is less than normal and to reduce the supply as the level increases above normal. By reducing such air to zero, liquid supply may be automatically terminated prior to overflow of the wheel chamber.

A full understanding of the invention and of its further objects and advantages will be had from the following description of certain illustrative manners in which it may be carried out. The particulars of that description, and of the accompanying drawings which form a part of it, are intended only as illustration and not as a limitation upon the scope of the invention, which is defined in the appended claims.

In the drawings:

FIG. 6 is an elevation, partly broken away, representing another embodiment of the invention;

FIG. 7 is a section on line 7—7 of FIG. 6;

FIG. 7A is a fragmentary section on line 7A—7A of FIG. 7;

FIG. 8 is a fragmentary section corresponding to FIG. 7 and representing a modification;

FIG. 9 is an elevation, partly broken away, representing another embodiment of the invention; and FIG. 10 is a section on line 10—10 of FIG. 9.

Figure 1:
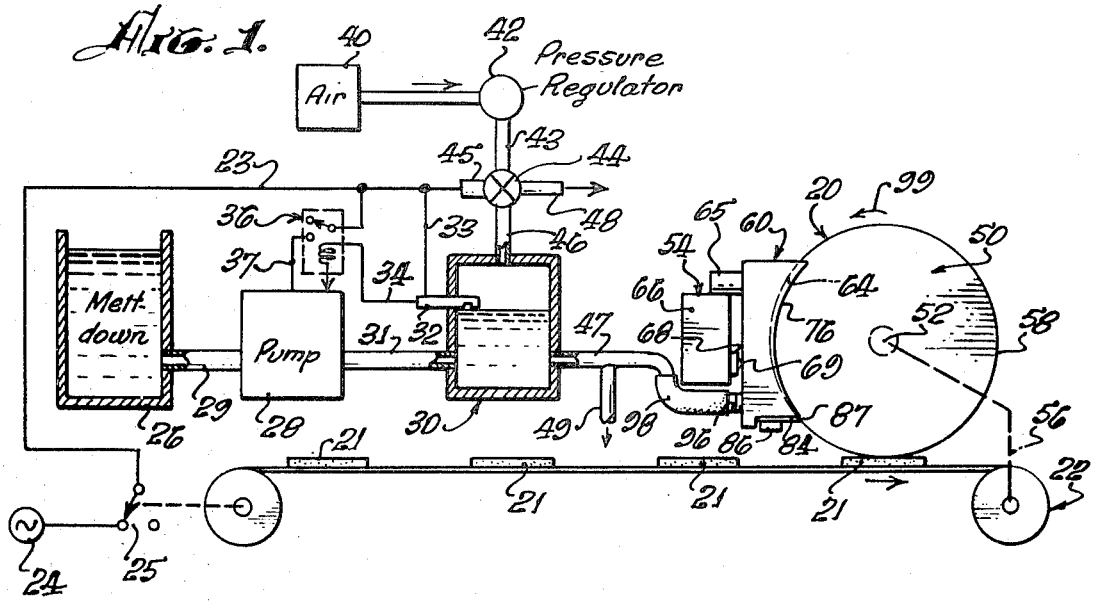
FIG. 1 is a schematic drawing representing an illustrative applicator system embodying the invention.
Figure 2:
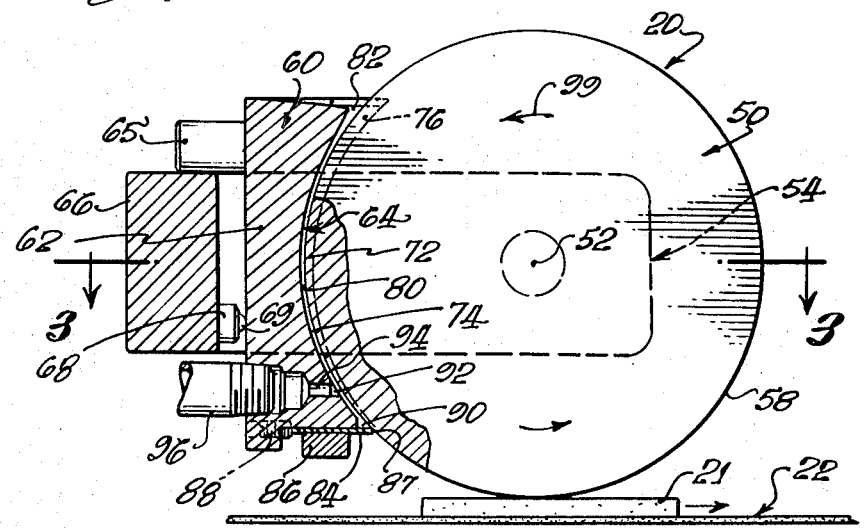
FIG. 2 is an elevation at enlarged scale, partly broken away on line 2—2 of FIG. 3.
Figure 3:
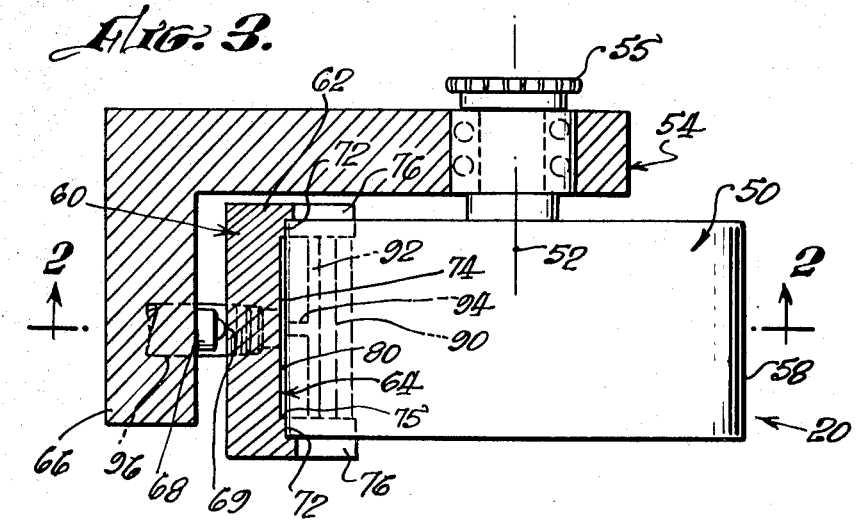
FIG. 3 is a section on line 3—3 of FIG. 2.

FIG. 1 represents in schematic form an illustrative system in accordance with the invention, details of applicator unit 20 being shown more fully in FIGS. 2 and 3. The system will be described as it applies typically to the application of hot melt adhesive to objects 21 on a conveyor system indicated schematically at 22. Electric power for operation and control of the system is supplied from the source 24 via the line 23, and is preferably interrupted automatically by opening of the switch 25 whenever conveyor 22 is stopped. The adhesive is added in solid form to the meltdown tank 26, which is maintained in known manner at a suitable temperature for melting the adhesive. Other parts of the liquid handling system are similarly maintained at controlled temperature by heaters and thermostats not explicitly shown. Electric power for such heaters preferably bypasses switch 25.

Adhesive is drawn by the pump 28 via the conduit 29 from tank 26 and is delivered via the conduit 31 to the pressure accumulator 30. Accumulator 30 is provided with a liquid level sensor 32, which may be of any suitable type, such, for example, as a conventional ultrasonic level sensor. Sensor 32 receives electric power over the line 33 from line 23 and delivers an output signal on the line 34 when the liquid in tank 30 is below the desired level. That signal operates the relay 36, closing a circuit which supplies power via the line 37 to pump 28. That power may directly drive pump 28 or may control the pump action in any suitable manner. In any case, upon deletion of power from line 37 the pump action is stopped. Accordingly, the pump operates only while conveyor 22 is operating and only if the liquid in accumulator 30 is below the desired level.

Accumulator 30 is maintained at a predetermined hydrostatic pressure, typically by admission of gas at a regulated pressure to the upper portion of its interior. As shown, air is supplied from a source 40, which is typically the regular plant air supply, via the pressure regulator 42, and the line 43 to the three-way solenoid valve 44. The solenoid 45 of valve 44 receives power from line 23. Such power energizes the valve to supply air at the regulated pressure via the line 46 to accumulator 30. Upon deletion of such power, valve 44 closes off line 43 and dumps the pressure in accumulator 30 via the outlet line 48. Liquid from accumulator 30 flows freely via the conduit 47 to applicator unit 20 at a supply pressure which is accurately controlled and conveniently variable by pressure regulator valve 42. Liquid may be supplied similarly in parallel via branch conduits indicated schematically at 49 to any desired number of additional applicator units, such as 20.

Applicator unit 20 comprises a wheel 50 which is journaled on the axis 52 on a support bracket indicated at 54. Wheel 50 is driven by any suitable linkage mechanism, indicated schematically at 56 in FIG. 1 and typically including the sprocket wheel 55 of FIG. 3, so that during operation of conveyor 22 it rotates continuously at a peripheral speed corresponding to the velocity of objects 21 on the conveyor. Wheel 50 has a cylindrical surface 58, which contacts objects 21, as they pass, applying to them a metered quantity of liquid adhesive. That adhesive is applied to the wheel surface by the pot assembly 60.

That assembly comprises the block 62 having on one side a generally cylindrical concave face 64 adapted to fit a portion of the wheel periphery in a manner more precisely described below. Block 62 also carries suitable fittings 65 for supporting it in suitable relation to the wheel on the arm 66 of bracket 54. That bracket preferably includes a spring assembly 68 having a finger 69 which engages block 62 and resiliently urges it into sliding contact with wheel 50.

The curved face 64 of block 50 has two axially spaced wheel contacting surfaces 72 which have a radius equal to that of the wheel so that they form essentially fluid tight sliding contacts with it. Between the surfaces 72, face 64 is relieved and forms a cylindrical surface 74 of radius slightly greater than that of the wheel. Axially outward of surfaces 72 are extensions 76 which enclose the extreme peripheral portion of the wheel, which they fit closely, providing additional sealing action. Extensions 76 also positively position block 66 axially with respect to the wheel. Fittings 65 permit free limited movement of block 62 to accommodate itself to the wheel.

The radius of block surface 74 is selected with respect to the wheel radius to form an annular passageway or channel 80 that is radially bounded by the wheel surface 58 and surface 74 and is axially bounded by the small offsets 75 between surface 74 and the respective bearing surfaces 72. Channel 80 typically extends essentially the full vertical height of block 62, with variations of radial dimension to be described. The wheel surface enters channel 80 at its upper end, as shown in FIG. 2 and leaves the channel at its lower end.

The entrance portion of the channel is flared, as indicated at 82, to facilitate receiving any liquid that may adhere to the wheel as it enters the channel. The channel exit is closed by the doctor blade 84, which typically comprises a sheet of spring metal retained by the block 86 and having a working edge 87, which typically slidingly engages the wheel surface or is slightly spaced from that surface under control of adjusting screws 88. That doctor blade meters liquid to the wheel surface in known manner, and may be replaced, if desired, by a doctor roller or any other equivalent structure. Channel 80 is preferably enlarged adjacent doctor blade 87, as indicated illustratively at 90, to ensure uniform access of liquid along the entire edge of the doctor blade. Channel 80 is also provided with an axially elongated inlet groove 92 into which fluid is delivered through one or more generally radial bores 94 from the inlet fitting 96. That fitting is preferably connected to the conduit 47 by means of a flexible tube section 98, which permits free limited movement of pot assembly 60 with respect to bracket 54 to ensure correct relation of the pot assembly to the wheel. The radial dimension of channel 80 is typically uniform, both axially and circumferentially, except for the expansions already described at 82, 90 and 92. However, that dimension may include gradual or abrupt variations, as desired, to modify the detailed nature of fluid behavior within the channel.

Assuming that wheel 50 is rotating at uniform speed in the forward direction indicated by the arrow 99, and considering initially that channel 80 is completely filled with viscous adhesive, such fluid will be subjected to viscous drag or shear due to the relative velocity existing between the moving wall of the wheel and the stationary pot wall 74. Assuming, for convenience of discussion, zero inward flow through supply fitting 96 and zero outward flow past doctor blade 87, the effect of that viscous shear upon liquid in channel 80 is to produce a fluid pressure that increases progressively from the free liquid surface at channel entrance 82 toward the channel region adjacent the doctor blade. Fluid can enter from conduit 47 only if the supply pressure exceeds the described fluid pressure produced by viscous action.

In accordance with an important aspect of this invention, the supply pressure is maintained, typically by adjustment of pressure regulating valve 42 (FIG. 1), at a value less than the pressure produced at groove 92 when channel 80 is completely filled with liquid. By so limiting the supply pressure, the wheel chamber cannot overflow at the free surface at 82 so long as wheel 50 continues to rotate. On the other hand, if liquid is removed from the chamber past doctor blade 84, lowering the free surface progressively from 82 toward 92, a critical point is reached at which the fluid pressure produced at 92 by viscous action becomes less than the supply pressure. Supply fluid then flows into the chamber at a rate that increases rapidly with further lowering of the liquid surface. In practice, the free liquid surface is retained reliably within a relatively small range of the described critical position, and that effective level varies only slightly even with large variations in the rate of removal of liquid at the doctor blade. If rotation of wheel 50 is stopped for any reason the supply pressure is automatically reduced essentially to atmospheric pressure by the action of solenoid valve 44, already described.

Figure 4:
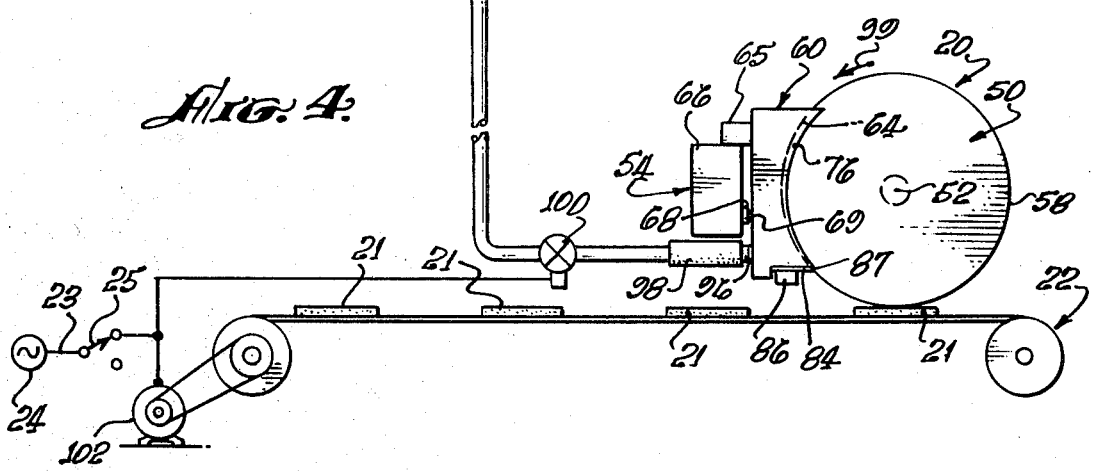
FIG. 4 is a schematic drawing representing a modification.

In order to disable liquid supply to the applicator wheel in absence of wheel rotation, valve 44 of FIG. 1 may be supplemented or replaced by a valve in the line 47 which is opened in response to wheel rotation and closed whenever the wheel is stopped. Such a valve may, for example, be a solenoid valve 100 that is normally closed and is opened when energized, the solenoid being connected as shown in FIG. 4 in parallel with the electric motor 102 that drives conveyor 22 or otherwise drives the applicator wheel. Such a valve positively blocks liquid supply when the wheel stops.

Whereas accumulator 30 represents a preferred means for supplying liquid at a controlled pressure, other known pressure control systems may be used, particularly if a valve is provided in line 47 that closes in absence of wheel rotation, as just described. In particular, a moderate pressure can be delivered to line 47 from a conventional meltdown tank by mounting the tank at suitable elevation above the applicator wheel to provide desired hydrostatic pressure. That elevation, of course, is such that the maximum hydrostatic pressure delivered when the meltdown tank is full is less than the pressure produced at the liquid inlet to channel 80 (FIG. 2) by viscous shear of the fluid. Small variations in the surface level in the meltdown tank are then of little consequence, since they cause only a small relative change in the level of the free surface in channel 80 (FIG. 2).

With channel 80 constructed as shown schematically in FIG. 2, the pressure at inlet groove 92 has an intermediate value between the atmospheric pressure at the free surface 80 and the elevated pressure at outlet groove 90. The illustrative proportions shown place grooves 90 and 92 relatively close together, so that the pressure difference between them is correspondingly small. That pressure difference may be eliminated completely by providing a main chamber of more conventional form that includes the regions at both grooves 90 and 92.

On the other hand, the pressure at the doctor blade may be made appreciably higher than the supply pressure by increasing to any desired extent the length of the channel section between the inlet and groove 90, or by decreasing the radial dimension of that channel section. That is particularly useful when the supply pressure is developed primarily or entirely by hydrostatic pressure, as in FIG. 4. For example, the superatmospheric pressure at the doctor device can readily be made to exceed that at the supply port by 25 percent, say, permitting an appreciable reduction in the hydrostatic head required to produce a given pressure at the doctor blade. That method of increasing pressure at the doctor blade is also useful when the liquid is supplied to the main body of the wheel chamber in conventional manner at substantially atmospheric pressure.

Figure 5:
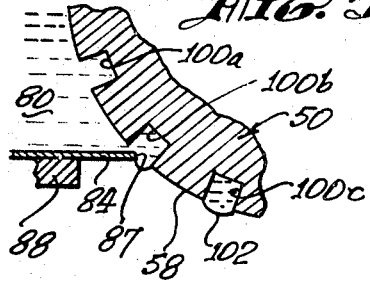
FIG. 5 is a schematic drawing illustrating operation of the invention in one of its aspects.

An important advantage of the invention is that the pressure at the doctor device can readily be made to exceed atmospheric pressure by far more than is feasible with conventional applicator wheels. If desired, the pressure at the doctor blade may also be made appreciably greater than the supply pressure, by increasing the length of the channel section between grooves 90 and 92 in FIG. 2. Elevated pressure at the doctor blade is particularly advantageous when the applicator wheel is of intaglio type, with small ports or recesses formed in the wheel surface which carry liquid past the doctor blade. FIG. 5 represents schematically the action of such a recess 100 in wheel surface 58 as it passes doctor blade 84. When the recess is within the wheel chamber as at 100a, it fills with liquid. As the recess passes the doctor blade, as at 100b, the blade tends to wipe the liquid flush with the wheel surface. However, in presence of appreciable pressure in channel 80, liquid flows around the edge of the doctor blade and forms a meniscus on the liquid surface, as indicated in FIG. 5 at 102, the size of that meniscus being limited by viscosity and capillary action, and tending to increase with the liquid pressure. When clear of the doctor blade as at 100c the recess is overfilled, providing ample liquid for application to the work, whether directly or via a further roller. Since the present invention permits wide controlled variation in the channel pressure, the degree of overfilling of the intaglio recesses can be correspondingly varied to meet varying requirements of the work.

Whereas it is usually preferred to design any one installation to produce a define required pressure at the doctor blade, it will be understood that adjustment of that pressure may be provided if desired, for example by forming the wall of channel 80 between inlet port 92 and the doctor blade as a movable element that can be slightly shifted radially with respect to the wheel.

In accordance with a further aspect of the invention, termination of liquid supply to the wheel chamber in absence of wheel rotation is obtained by providing in the supply line two valves in series which are driven with the applicator wheel so that they open intermittently and alternately. Then, when the wheel is stopped for any reason, one or other of the valves is closed and prevents overflow of the wheel chamber. Such mechanism has the advantage that it is purely mechanical and is therefore particularly economical and reliable.

In the embodiment of FIGS. 6 and 7, the applicator wheel 110 is fixed on the shaft 112 and driven in conventional manner via the sprocket 114. Shaft 112 is journaled in the block 116, upon which is mounted the meltdown tank and supply chamber 120 with the filter 123. These elements are maintained at suitable temperature, as by electrical heaters and thermostat elements indicated at 121 and 122. Wheel 110 is enclosed, except for its upper periphery, which engages the work, by the spacer plate 124 and end plate 126, which are rigidly mounted by the screws 115 on the flat end 117 of block 116. Spacer plate 124 is of such thickness that the axial wheel faces 118 and 119 provide a sealing fit with block end face 117 and the inner face of end plate 126. The circular recess 128 in spacing plate 124 is of such diameter as to clear the wheel periphery by a definite small distance, typically from 10 to 40 mils, for example, forming an arcuate channel 132 which is exaggerated in thickness in the drawings for clarity of illustration. Further recesses 134 and 135 are cut in the wall of that channel, typically extending axially the full thickness of spacer plate 124. An elongated recess 136 is formed in the end face 117 of block 116, extending chordwise with respect to the wheel and interconnecting the axially inner ends of the two recesses 134 and 135. Channel 132 and the recesses 134, 135 and 136 form collectively a chamber that will be referred to as the wheel chamber and designated generally by the numeral 130.

The doctor blade 140 is mounted on the upper surface of spacing plate 124 by the screws 141, with adjusting screw 142, on the side of the wheel at which it leaves the wheel chamber. On the other side of the wheel, at which it reenters the wheel chamber, the upper surface of spacing plate 124 is beveled to form an entry chamber 144 to guide any excess adhesive on the wheel periphery into wheel chamber 130. The mechanism as shown in FIG. 6 is adapted for counterclockwise wheel rotation. If a particular installation requires clockwise wheel drive, it is only necessary to remove screws 115, reverse spacer plate 124 and its carried doctor device, and reassemble.

The pressure head in supply chamber 120 is amply high to induce flow to the wheel chamber. Liquid is conducted between those chambers via the axial passages 150 in block 116, which opens through block end face 117 at a point offset from the shaft axis and spaced from recess 136. Liquid is conveyed from the end of passage 150 to recess 136 by one or more valve chambers 154 in the wheel. Four such chambers are shown, comprising simple axial through bores at a common radius from the wheel axis that equals the radial offset of passage 150. The openings of those bores through wheel face 118 form valve ports. Each of these ports opens to passage 150 at one angular range of the wheel rotation and opens to recess 136 of chamber 130 at another angular range of the wheel rotation. Since those two angular ranges do not overlap, flow of liquid is positively cut off in absence of wheel rotation. Therefore the described structure automatically prevents overflow of wheel chamber 130 when the wheel drive is terminated.

If the system is filled with liquid, including passage 150, the whole of recess 136, and all of the valve chambers 154, virtually no fluid is transmitted by the described structure. For, when one of the valve chambers is opened to passage 150 at 154a no liquid can enter since the chamber is already full; and when it reaches 154b and is opened to recess 136 no liquid can leave, since there is nothing to take its place. On the other hand, if a valve chamber contains a resiliently compressible structure of any sort, for example an air bubble, the described mechanism acts as a pump to deliver liquid to recess 136 at essentially the same pressure head as the liquid in passage 150 and at a rate that tends to increase in proportion to the size of the air bubble. Under that condition a valve chamber at 154a is filled until the air bubble is compressed to the pressure standing in passage 150. Flow of liquid into the valve chamber from passage 150 is facilitated by the flaring mouth 151, shown best in FIG. 7A, which extends the mouth dimensions in a circumferential direction. When the valve chamber reaches 154b it is exposed to the pressure standing in recess 136. If that pressure is lower than the supply pressure, the air bubble expands to an extent determined primarily by the difference between the two pressures, expelling a corresponding amount of liquid into the wheel chamber. However, if the pressure in recess 136 equals that in passage 150, no expansion of the air bubble can occur, and no liquid is delivered, just as when no air bubble is present in the valve chamber. The pumping action of the described system therefore responds primarily to two variables, the pressure difference between inlet and outlet, and the volume of the compressible structure contained in each valve chamber.

The portion of channel 132 between inlet chamber 144 and recess 136, designated 132a, is made sufficiently small in radial dimension that during wheel rotation the shear pressure produced by adhesive filling that channel portion exceeds the pressure head in supply chamber 120. Under that condition the wheel chamber cannot overflow during wheel rotation; and if the wheel stops, supply of liquid is positively blocked by closure of the dual valve assembly. However, during normal operation, channel portion 132a usually contains little liquid beyond that which has been returned to it by the reentering wheel surface and which is moved down to recess 134 by shearing action of the wheel. Some air tends to be carried along with such returned adhesive, typically maintaining an air bubble of variable size in recess 134 and in the adjacent portion of recess 136. Abnormally rapid consumption of adhesive tends to increase the size of that bubble, making air available to the valve chambers, increasing their pumping action and restoring equilibrium.

The portion of channel 132 between recess 135 and the doctor blade, designated 132b, provides increased adhesive pressure at the doctor blade due to shearing action of the wheel in the manner already described. The channel portion 132c which arcuately connects the two ends of recess 136 tends to maintain liquid circulation through that channel from recess 134 to 135 and back through recess 136. That has the useful effect of maintaining liquid in recess 135 even during maximum consumption of adhesive, ensuring adequate supply to the wheel at the doctor blade and to pressurizing channel portion 132b. However, that action of channel portion 132c is not usually essential, and the radial dimension of that passage section may be increased, if desired. Alternatively, recess 135 may be omitted entirely, and recess 136 shortened so that it extends from recess 134 only part way along the wheel chord. Channel portions 132b and 132c then both act to increase the fluid pressure at the doctor blade.

During wheel rotation the radial position of an air bubble in a valve chamber 154 depends upon the relation between the density of the adhesive and the centrifugal force resulting from the rotation. In the structure of FIGS. 6 and 7 both the top and bottom of the valve chamber, as it opens to supply passage 150, are offset from the walls of that passage in a direction tending to retain air in the valve chamber. Also, as each valve chamber passes recess 136 the relatively high level of the valve chamber assists movement of air into it. Therefore under normal operating conditions each valve chamber contains sufficient air to ensure adequate liquid supply.

If it is preferred to make the reentry channel 132a of FIG. 6 of conventional radial dimensions, overflow of the wheel chamber under conditions of minimum consumption of adhesive may be avoided by designing the valve chambers and port structure so that air is retained in the valve chambers only if the liquid in the wheel chamber is below a critical level. If that level should rise, the air bubbles in the valve chambers then escape, terminating the pumping action. For example, as illustrated in FIG. 8, the valve chambers may comprise conical recesses 154e in the wheel with the base of the cone in wheel face 118 forming ports that are smaller in diameter than the radial dimension of the aperture to wheel chamber 130a.

A particular advantage of the wheel chamber the structure shown in FIGS. 6 and 7 is that, like the previously described form, it may be employed in virtually any desired orientation with respect to gravity. For example, to apply adhesive to the upper surface of the work, the entire block 116 may be inverted, supply chamber 120 being mounted on the opposite block face from that shown in FIGS. 6 and 7. Passage 150 must then be modified to reach the supply chamber. Also, it is then preferred to omit recess 134 on the reentry side of the wheel, so that in absence of wheel rotation liquid from recess 136 has access to channel 132 only via recess 135 on the doctor blade side, reducing any tendency to drip.

It will be understood that when the valve chamber or chambers are through bores in the wheel, as shown in FIG. 7, recess 136 may be formed in cover plate 126, if preferred, rather than in the block 116, as shown. The valve port structure then includes both ends of the valve chambers, one end acting as valve port to the supply chamber and the other end acting as valve port to the wheel chamber.

A further illustrative embodiment of the invention is shown in FIGS. 9 and 10. The wheel 160 is mounted on the shaft 162 and rotates in the recess 164 in the block 163. That recess has the arcuate wall 165 on the reentry side of the wheel, closely spaced from the wheel periphery and forming the radially narrow channel 166 which prevents overflow of the wheel chamber as already described. On the other side of the wheel the recess wall 167 is spaced more widely from the wheel periphery and forms the wider channel 168. Even if that channel is not filled with adhesive, the wheel surface will carry sufficient adhesive to the doctor blade to insure proper loading of the applicator surface. The cover plate 172 contains the generally rectangular recess 169 which communicates with channels 166 and 168, forming the wheel chamber, designated generally by the numeral 170. The doctor blade is similar to that of FIG. 6.

The valve chamber in FIGS. 9 and 10 comprises the axial bore 174 in shaft 162, opening at its inner end through the radial inlet valve port 175 to the vertical bore 176 and supply chamber 177 when the shaft is in the position illustrated. The outer end of axial passage 174 communicates with the radial slot 180, formed in the flat outer face of wheel 160. That slot forms an outlet valve port, which opens to wheel chamber 170 when the shaft is 180° from the position shown.

The inlet and outlet valve ports for the valve chamber are thus distinct in the embodiment of FIG. 9 and 10, whereas in the embodiment of FIGS. 6 to 8 each valve chamber had only a single port, which served alternately as inlet port and as outlet port. It will be evident that many modifications of the chamber and port structure may be made, while carrying out the essential concepts of the invention.

I claim:

1. In an applicator for a viscous liquid, said applicator including an applicator wheel mounted for rotation in a forward direction with respect to a wheel axis and having a generally cylindrical convex metering surface, structure forming with a limited portion of the wheel surface a chamber for containing the viscous liquid, said structure including an inlet port opening into the chamber and a doctor device for metering the liquid onto the wheel surface as it leaves the chamber; the improvement characterized in that:

said chamber-forming structure includes a generally cylindrical concave chamber wall opposedly spaced from the wheel surface and forming with that surface an annular channel that extends through an appreciable arc with respect to the wheel axis between where the wheel surface enters the chamber and said inlet port, the radial dimension of the channel being sufficiently small that wheel rotation exerts upon liquid in the channel a viscous drag in the direction of wheel rotation and thereby produces at the inlet port a superatmospheric pressure that increases with wheel speed and with the circumferential length of channel that is filled with liquid;

said applicator includes means for driving the wheel at a normal speed at which said pressure has a predetermined critical value when the channel is filled with liquid;

means for supplying liquid to the inlet port essentially continuously during such wheel rotation at a controlled superatmospheric pressure that is less than said critical pressure;

said liquid supplying means comprising a supply chamber containing liquid at said controlled pressure;

conduit means for conducting liquid from the supply chamber to the first said chamber, said conduit means including two valve means acting in series; and means driven with the wheel rotation for opening the valve means intermittently and alternately, at least one valve means being always closed;

whereby liquid supply is terminated in absence of wheel rotation.

2. The improvement defined in claim 1, and in which said valve means are arranged to supply air to the conduit portion between the valve means at least when said channel is empty.

3. Mechanism for supplying a liquid to an applicator that comprises a wheel assembly including an applicator wheel mounted for rotation in a forward direction with respect to an axis, structure forming with a limited portion of the wheel surface a wheel chamber for containing the liquid, and a doctor device for metering the liquid carried by the wheel surface as it leaves the chamber; said mechanism comprising in combination:

a supply chamber for containing liquid at a pressure head sufficient to move liquid to the wheel chamber to raise the liquid level therein above the minimum level at which liquid just wets the wheel surface;

structure forming a valve chamber at least partially recessed in the wheel assembly and having port structure that opens to the supply chamber when the wheel assembly is within one angular range of its rotation, and opens to the wheel chamber when the wheel assembly is within another angular range of its rotation, said two angular ranges being nonoverlapping; and the port structure that opens to the wheel chamber being at least partially above the minimum liquid level at which liquid just wets the wheel surface, whereby air is admitted increasingly from the wheel chamber into the valve chamber as the liquid level in the wheel chamber decreases toward said minimum level.

4. The combination defined in claim 3, and in which:

said wheel assembly includes a shaft on which said wheel is mounted, the wheel having an axial face; and said valve chamber comprises a generally axial passage within the wheel assembly opening radially to the supply chamber through first port structure in the shaft wall and opening axially to the wheel chamber through second port structure in the axial face of the wheel radially offset from the axis.

5. The combination defined in claim 3, and in which:

said wheel has an axial face; and said valve chamber is formed in the wheel with said port structure opening through the axial wheel face radially offset from the axis.

6. The combination defined in claim 3, and in which:

the valve chamber is so related to the port structure that opening of the port structure to the wheel chamber releases air from the valve chamber to the wheel chamber when the surface level therein is above the open port structure, absence of air in the valve chamber terminating liquid supply from the supply chamber to the wheel chamber; and the wheel chamber has a capacity sufficient to prevent overflow prior to such termination.

7. The combination in claim 3, and in which:

said structure forming the wheel chamber includes a concave chamber wall opposedly spaced from the wheel surface and forming therewith a generally annular channel through which the wheel surface reenters the wheel chamber, the radial dimension of the channel being sufficiently small that wheel rotation exerts upon liquid in the channel a viscous drag in the direction of wheel rotation and thereby produces in the wheel chamber a superatmospheric pressure that increases with the circumferential length of channel that is filled with liquid; and said pressure head in the supply chamber is insufficient to overcome said superatmospheric pressure when the channel is filled with liquid;

whereby liquid supply to the wheel chamber is terminated prior to overflow.

8. An applicator for a viscous liquid, comprising in combination:

an applicator wheel assembly mounted for rotation in a forward direction with respect to an axis and including a generally cylindrical metering surface and circumferentially continuous surface of revolution means;

structure forming a wheel chamber that is partially bounded by limited sectors of said metering surface and of said surface of revolution means, said structure including a face fittingly and slidingly engaging another sector of said surface of revolution means;

a supply chamber for containing liquid at a pressure head sufficient to move liquid to the wheel chamber;

a doctor device for metering the liquid carried by the metering surface as it leaves the chamber;

passage means communicating at one end with the supply chamber and opening at the other end through a port in said face; and at least one recess in the wheel assembly opening through said surface of revolution means and positioned to communicate alternately with said port and with said wheel chamber.

9. An applicator as defined in claim 8, and in which said recess is provided with resiliently compressible structure responsive to pressure variations in the recess.

10. An applicator as defined in claim 8, and in which said mechanism is arranged for admitting air to said recess to provide therein resiliently compressible structure responsive to pressure variations in the recess.